4/22/86 OR 4,584,456

United States Patent [19]

Oodaira et al.

[11] Patent Number: 4,584,456

[45] Date of Patent: Apr. 22, 1986

[54] PRODUCTION OF RESISTOR FROM INSULATING MATERIAL BY LOCAL HEATING

[75] Inventors: Hirosi Oodaira, Chigasaki; Haruko Suzuki; Masayuki Saito, both of Yokohama; Nobuo Iwase, Kamakura, all of Japan

[73] Assignee: Tokyo Shibaura Denki Kabushiki Kaisha, Kawasaki, Japan

[21] Appl. No.: 530,107

[22] Filed: Sep. 7, 1983

[30] Foreign Application Priority Data

| | | | |
|---|---|---|---|
| Sep. 8, 1982 | [JP] | Japan | 57-155187 |
| May 26, 1983 | [JP] | Japan | 58-92675 |
| May 26, 1983 | [JP] | Japan | 58-92677 |

[51] Int. Cl.[4] .......... B23K 26/00

[52] U.S. Cl. .......... 219/121 LM; 219/121 LF; 219/121 EM; 338/195; 338/334

[58] Field of Search ..... 219/121 L, 121 LM, 121 EB, 219/121 EM, 121 LF; 338/195, 334

[56] References Cited

U.S. PATENT DOCUMENTS

| | | | |
|---|---|---|---|
| 4,032,881 | 6/1977 | Singleton | 338/195 |
| 4,286,250 | 8/1981 | Sacchetti | 338/306 |

FOREIGN PATENT DOCUMENTS 1104152 11/1965 United Kingdom .

OTHER PUBLICATIONS

32nd Electronic Components Conference, P. J. Sacchetti, p. 511, "Formation of Resistors in Polymerec Substrates", May 10-12, 1982.

Laser Focus, vol. 19, No. 2, pp. 28-32, Feb. 1983, "Laser-formed Carbon Resistors".

SPE Tech. Pap. An. Tech. Conf., Alonso R. Ramos, pp. 393-394, '77, "Generation of Electrically Conductive Paths on Polymer Composites".

*Primary Examiner*—M. H. Paschall

*Attorney, Agent, or Firm*—Oblon, Fisher, Spivak, McClelland & Maier

[57] ABSTRACT

A resistor is formed by locally heating an insulating material layer between conductors to convert the heated material into a first resistor element. A second resistor element is formed to contact the first resistor element while measuring the resistance between the conductors, until a desired resistor composed of the first and second resistor elements and having a predetermined resistance value is obtained.

21 Claims, 11 Drawing Figures

PRODUCTION OF RESISTOR FROM INSULATING MATERIAL BY LOCAL HEATINGcl

BACKGROUND OF THE INVENTION

1. Field of the Invention

The present invention relates to a method for producing a resistor and, more particularly, to a method for producing a resistor from an insulating material by local heating.

2. Description of the Prior Art

Formation of a resistor element in a printed circuit is well known. A method for forming such a resistor element by carbonization under heating, in particular, by carbonization under irradiation with a laser beam, is disclosed in U.S. Pat. No. 4,286,250 (issued on Aug. 25, 1981 to Sacchetti). According to this method, only a predetermined portion of an insulating substrate of a heat-resistant plastic is scanned with a laser beam. The portion of the substrate which is irradiated with a laser beam is carbonized to form a predetermined resistor element pattern. Thereafter, conductors are connected to the two ends of the obtained resistor element to provide an electric part.

The heat-resistant plastics disclosed are polyimides, polysulfones, polyphenylene sulfides, polyamide-imide, and fluoroplastics.

The carbonization technique utilizing a laser beam as described above allows control of a laser beam spot to a very small diameter and allows easy formation of a fine resistor element pattern. It is reported that a resistor element produced by this method has a performance higher than that of a carbon-resin composition resistor and equivalent to that of a carbon coated resistor.

However, the carbonization technique utilizing a laser beam as described above does not allow the formation of a resistor having a desired resistance between conductors. This is because the laser beam has a fluctuation in intensity, even though it is generally considered to have a uniform intensity. When conductors are formed after forming such a resistor element, the resistance of the resistor element also changes due to misalignment of the conductors.

It has also been found that the stability of a resistor element produced by carbonization of a conventional heat-resistant plastic as noted above deteriorates with time. In particular, when such a resistor element is left at a high temperature or a high humidity for a long period of time, the resistance is largely changed, thus presenting the problem of reliability.

SUMMARY OF THE INVENTION

It is a main object of the present invention to provide a method for producing a resistor which retains the advantages of the conventional technique and which also improves thereupon.

It is another object of the present invention to provide a method for producing a resistor having a predetermined resistance by carbonization under heating.

It is still another object of the present invention to provide a method for producing a resistor obtained by carbonization under heating, which has excellent stability of performance over time.

In order to form a resistor of a predetermined resistance according to the present invention, a substrate is provided, at least a surface layer portion of which is made of an insulating material which may be converted into a resistor material. First and second conductor layers are formed in contact with the surface layer portion of the substrate and spaced apart from each other. The surface layer portion of the substrate between the first and second conductor layers is locally heated so as to convert the insulating material at this portion to a resistor material, thereby forming a first-stage resistor comprising at least one first linear resistor element formed of the resistor material and having two ends in contact with the first and second conductor layers, respectively.

Thereafter, while simultaneously measuring the resistance between the first and second conductor layers, the portion of the surface layer of the substrate between the first and second conductor layers is locally heated thereby forming at least one second resistor element in contact with the first resistor element, until a second-stage resistor having a predetermine resistance and comprising the first and second resistor elements is substantially produced.

The second linear resistor element may cross the first linear resistor element at one or more points. The second linear resistor element may contact with the first linear resistor element along the longitudinal direction. In these cases, the first-stage resistor has a resistance higher than the predetermined resistance; the formation of the second linear resistor element lowers the resistance of the first-stage resistor to the predetermined resistance.

The second linear resistor element may be formed on top of the first linear resistor element. In this case, the first-stage resistor has a resistance lower than the predetermined resistance; the formation of the second linear resistor element increases the resistance of the first-stage resistor to the predetermined resistance.

In order to form a resistor having excellent performance stability over time according to the present invention, a substrate is provided at least a surface layer portion of which is made of an insulating material comprising an organic polymeric material containing 5% by weight or more of acrylonitrile; and the surface layer of the substrate is selectively heated so as to carbonize the organic polymeric material comprising the heated portion of the surface layer thereby converting the heated portion into a resistor.

The organic polymeric material may comprise at least one acrylonitrile-based polymer or may alternatively comprise a combination of at least one acrylonitrile-based polymer and at least one nonacrylonitrile-based polymer. Although both thermoplastic and thermosetting polymers are included among nonacrylonitrile-based polymers, the latter is preferable for the reason to be described below.

The term "acrylonitrile-based polymer" used herein means polymeric materials which contain acrylonitrile units and includes a homopolymer of acrylonitrile and copolymers (copolymers, terpolymers and the like) of acrylonitrile with at least one organic polymerizable monomer.

The term "non-acrylonitrile-based polymer" used herein means polymers which do not contain acrylonitrile units.

In any case, heating is preferably performed by irradiation with a laser beam.

DETAILED DESCRIPTION OF THE PREFERRED EMBODIMENTS

The preferred embodiment of the present invention will now be described with reference to the accompanying drawings.

Figure 1A:
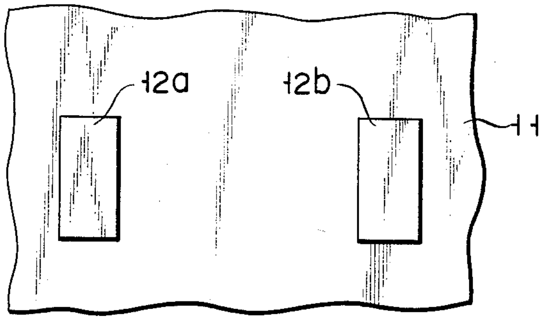
FIGS. 1A to 1D are plane views for explaining a first embodiment of the present invention.

FIGS. 1A to 1D show the first embodiment of the present invention. First, as shown in FIG. 1A, conductors 12*a* and 12*b* are formed on an insulating substrate such as an alumina substrate 11 so as to be spaced apart from each other. The conductors 12*a* and 12*b* may be formed of a metal or may be formed by printing of a paste containing a metal powder and a resin or a metal powder and glass powder and a resin, and curing or sintering printed paste.

Figure 1B:
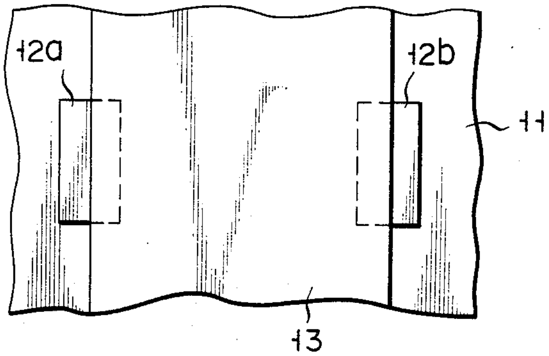

Subsequently, as shown in FIG. 1B, a layer 13 of an insulating layer (to be explained in detail hereinafter) which may be converted into a resistor material upon heating is uniformly formed on a portion of the insulating substrate 11 between the conductors 12*a* and 12*b* and on portions of the conductors 12*a* and 12*b*.

Figure 1C:
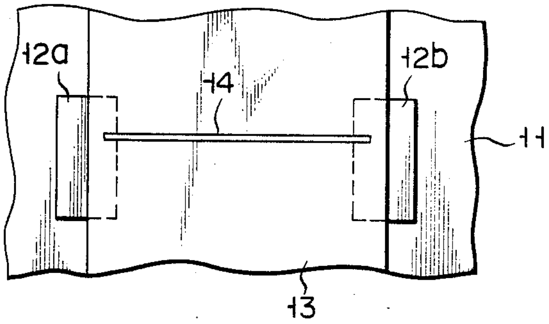

After forming the layer 13, a laser beam is irradiated in a desired pattern (straight line in this case) from the conductor 12*a* toward the conductor 12*b*. The irradiated insulating material portion is converted into a resistor material to form a first linear resistor element 14, as shown in FIG. 1C. Any laser may be used provided a laser beam produced therefrom is capable of converting an insulating material used into a resistor element. However, in favor of operability in the air and high conversion efficiency, an infrared ray laser such as a YAG laser or a carbon dioxide gas laser; a visible light laser such as an argon laser or a ruby laser; and the like is preferably used. Such a laser can produce a beam having a uniform wavelength and has an excellent focusing performance. Accordingly, the optical light energy can be concentrated on a specific point to achieve high-energy irradiation. The insulating material can therefore be converted locally into a resistor material.

In order to scan the laser beam along a predetermined pattern, the laser beam may be deflected using a mirror, with the substrate 11 being fixed in position. Alternatively, the laser beam may be fixed, and the substrate 11 is moved by an X-Y table. As is well known in this field, the laser beam may be scanned automatically using a control circuit. Automatic scanning of a laser beam using an X-Y table is disclosed, for example, in U.S. Pat. No. 4,286,250. A laser with a control circuit is available as "Laser Trimmer LAY 711" (Nd:YAG laser device) from TOSHIBA CORPORATION.

The resistor element 14 is formed to have a resistance slightly higher than a target resistance. For this purpose, the irradiation conditions of the laser beam or the distance between the conductors 12*a* and 12*b* are adjusted. Such conditions may be determined by simple preliminary experiments.

Figure 1D:
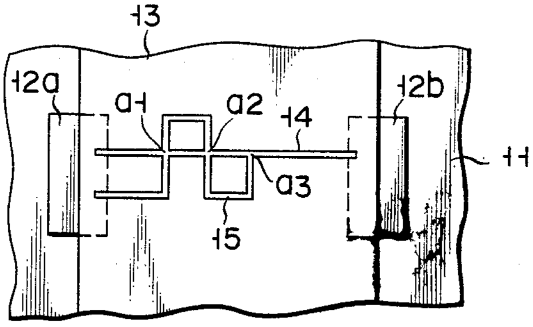

After thus forming the first-stage resistor (in this case, consisting of one linear resistor element 14) between the conductors 12*a* and 12*b*, the resistance between the conductors 12*a* and 12*b* can be measured. Then, as shown in FIG. 1D, a second linear resistor element 15 is formed by irradiation with a laser beam to repeatedly cross the resistor element 14. The second resistor element 15 is formed starting from the conductor 12*a*. When the second resistor element 15 crosses the first resistor element 14 for the first time at point $a_1$, the resistance between the conductors 12*a* and 12*b* is lowered. When the second resistor element 15 crosses the first resistor element 14 again at point $a_2$, the resistance between the conductors 12*a* and 12*b* is further lowered. In this manner, the second resistor element 15 is formed to repeatedly cross the first resistor element 14. Formation of the second resistor element 15 is terminated, for example, at point $a_3$ when the resistance between the conductors 12*a* and 12*b* reaches a predetermined value.

Figure 2:
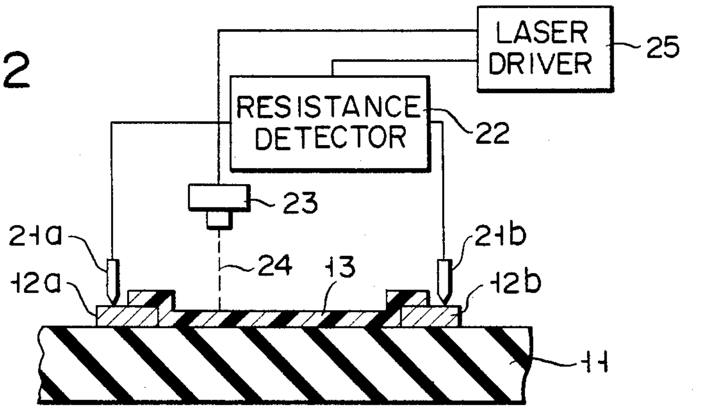
FIG. 2 is a schematic block diagram of a resistor forming system to be used in the method of the present invention.

While the resistor element 15 is being formed, the resistance of the resistor being produced is measured. When the measured resistance reaches a predetermined value, the production of the resistor element 15 is terminated as mentioned above. This is shown in FIG. 2. Probes 21*a* and 21*b* are made to stand on the conductors 12*a* and 12*b*, respectively, and are connected to a resistance detector 22. The resistance detector 22 is connected to a laser 23 through a laser driver 25. The resistance detector 22 detects the resistance of the resistor being formed between the conductors 12*a* and 12*b*. When the measured resistance reaches a predetermined value, the resistance detector 22 produces a signal. In response to this signal, the laser driver 25 stops the irradiation of a laser beam 24 from the laser 23.

In this manner, a resistor having a predetermined resistance is obtained. The smaller the pitch between crossing points of the first and second resistor elements, the higher the control precision of the resistance of the obtained resistor.

Figure 3:
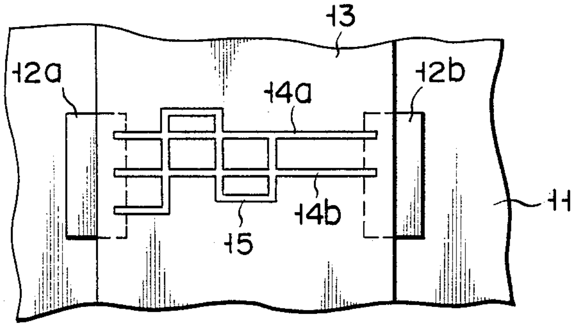
FIG. 3 is a plane view for explaining a second embodiment of the present invention.

FIG. 3 shows a second embodiment of the present invention which is a modification of the first embodiment. According to this embodiment, a first-stage resistor preformed between conductors 12*a* and 12*b* comprises a plurality of (i.e., two, in this case) linear resistor elements 14*a* and 14*b*. A second linear resistor element 15 is formed to cross these resistor elements 14*a* and 14*b*. In this embodiment, the plurality of first linear resistor elements are formed until the resistance of the first-stage resistor is slightly higher than a predetermined value. Thereafter, the second resistor element is formed to cross these first linear resistor elements so that fine adjustment of the resistance of the resultant resistor is facilitated.

Figure 4A:
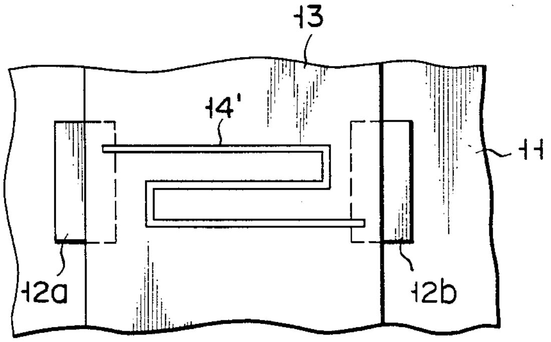
FIGS. 4A and 4B are plan views for explaining a third embodiment of the present invention.
Figure 4B:
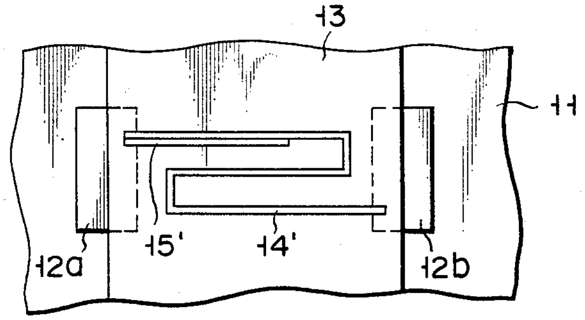

FIGS. 4A and 4B show a third embodiment which is most preferred at present. In the same manner as described with reference to FIGS. 1A to 1C, conductors 12*a* and 12*b*, an insulating layer 13, and a first linear resistor element 14' (in this case, a rectangular zigzag form) are formed on a substrate 11 (FIG. 4A). Thereafter, a laser beam is scanned along the resistor element 14' to form a second linear resistor element 15' (FIG. 4B). At this time, the resistor element 15' is formed in contact with the linear resistor element 14' along the longitudinal direction. In other words, the resistor element 15' is formed to widen the resistor element 14' from the portion thereof in contact with the conductor 12*a*.

Needless to say, while the second resistor element 15' is being formed, the resistance between the conductors is continuously measured. When the measured resistance reaches a predetermined value, formation of the second resistor element is terminated. If the measured resistance does not reach a predetermined value even after the resistor element 15' reaches the conductor 12*b* along the resistor element 14', third, fourth, fifth, . . . resistor elements are formed to constitute the resultant resistor. In this manner, a resistor having a predetermined resistance can be formed between the conductors 12*a* and 12*b* with high precision.

According to the third embodiment, since the resistance of the resistor being produced continually changes (decreases), it is extremely easy to set the resistance of the resistor at a preset value. In the third embodiment, the first-stage resistor formed between the conductors 12*a* and 12*b* may also comprise a plurality of linear resistor elements. In this case, any one second resistor element may be formed along any one of the plurality of first resistor elements formed. If a predetermined resistance of the resistor is not obtained after a second resistor element is formed from one conductor to the other conductor, an additional resistor element may be formed along any of the resistor elements which have been formed already.

Figure 5:
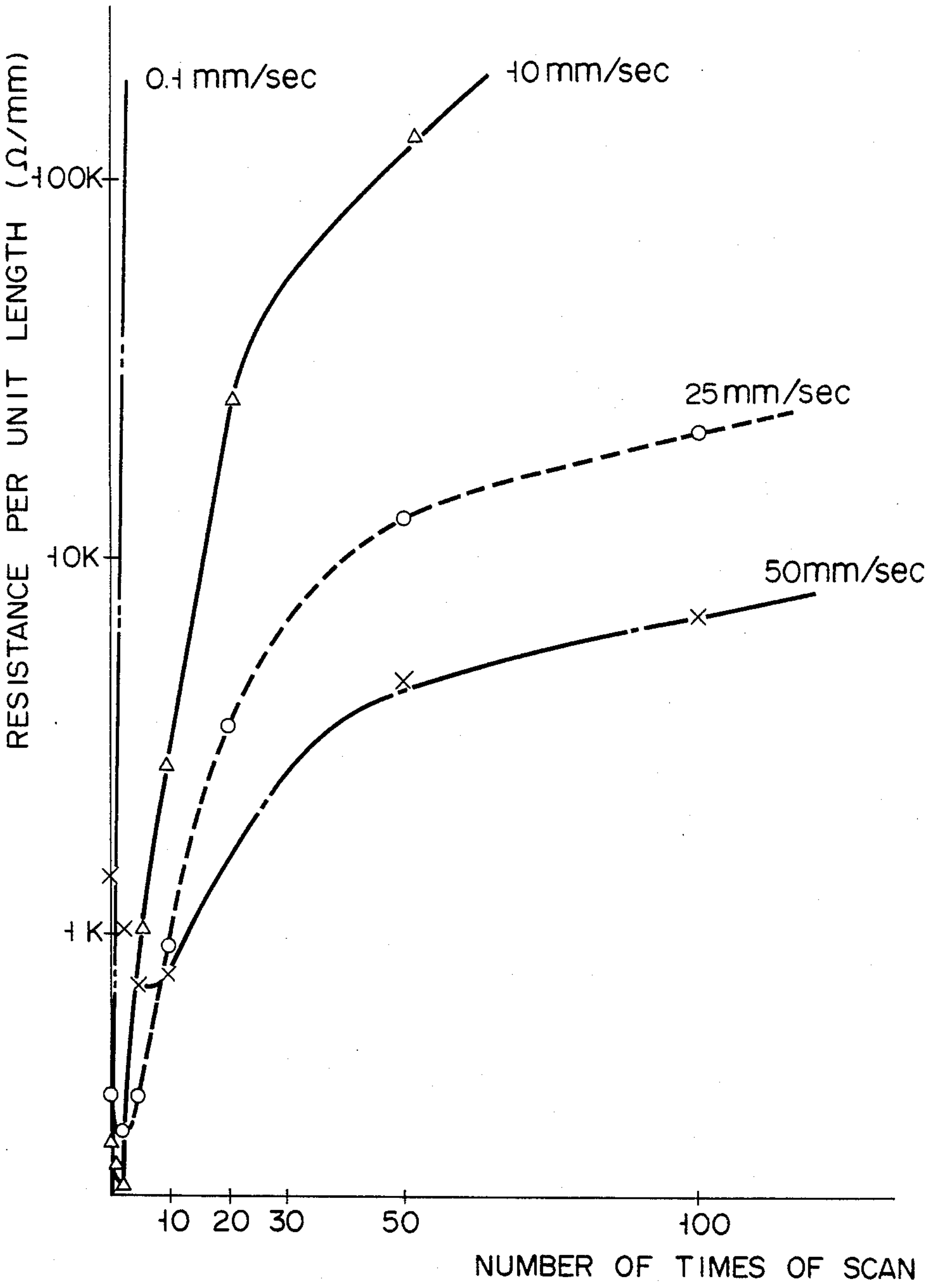
FIG. 5 is a graph showing the relationship between resistance per unit length and the number of times of scanning with a laser beam for forming a resistor.

In the first to third embodiments described above, the first-stage resistor formed first has a resistance higher than a target resistance. The resistance of the first-stage resistor is lowered by additionally forming the second linear resistor element, thereby achieving the target resistance. However, it was found that if at least one linear resistor element of the first-stage resistor is reheated, the resistance is increased. In accordance with this finding, if the resistance of the first-stage resistor is kept lower than a target value and a second resistor element is produced by reheating the first resistor element while measuring the resistance between the conductors 12*a* and 12*b*, then a resistor of a predetermined resistance may be produced. The resistance of the second-stage resistor formed by this additional heating or reheating largely depends upon the scanning speed at which additional heating or reheating is performed. FIG. 5 shows the relationship between the resistance per unit length of the resistor formed and the number of scanning operations at various scanning speeds. As may be seen from FIG. 5, the rate of increase in resistance increases with a decrease in the heating/scanning speed. A scanning speed which allows easy control of the resistance may therefore be selected in accordance with the target resistance.

In the embodiments described above, the conductors 12*a* and 12*b* are formed prior to formation of the layer 13. However, the conductors 12*a* and 12*b* may be formed on the layer 13 after the layer 13 is formed. In this case, the substrate may comprise a conductive material such as a metal. If the substrate is made of a conductive material, the resistor element must be formed to a depth so as not to reach the substrate. The substrate may entirely consist of an insulating material which may be converted into a resistor material. The heating means for converting an insulating material into a resistor material is not limited to a laser and may comprise any other means provided such means is capable of achieving local heating.

An insulating material which may be converted into a resistor material by heating according to the method of the present invention includes an organic polymeric material. Such an organic polymer material includes a thermoplastic polymer, a thermosetting polymer, or a combination of more than one of each type of polymer. Examples of such an organic polymeric material include polyimides, polyamide-imide, polybenzoimidazoles, melamine resin, bismaleimidetriazine resin, polysulfones, polyphenylenesulfides, and the like.

When an organic polymeric material having an acrylonitrile content of 5% by weight or more is used, a resistor having a very small change in resistance even if it is left at a high temperature and/or high humidity can be obtained by heating. If the acrylonitrile content of the organic polymeric material used is less than 5% by weight, a resistance with excellent performance stability over time cannot be obtained.

The organic polymeric material containing acrylonitrile may comprise acrylonitrile-based polymers alone. Acrylonitrile-based polymers include a homopolymer and an copolymer of acrylonitrile. Examples of organic monomers which can form copolymers with acrylonitrile include styrene-based compounds such as styrene, divinylbenzene, vinyl toluene, chlorostyrene, or p-tert-butylstyrene; allyl esters such as diallyl phthalate or diallyl fumarate; acrylic compounds such as acrylic acid, methacrylic acid, methyl methacrylate, n-butyl acrylate, 2-ethylhexylethylene glycol dimethacrylate, pentaerythritol triacrylate, triethylene glycol diacrylate, diglycidyl methacrylate, or $\beta$-hydroxyethyl methacrylate; and vinyl-based compounds such as vinyl propionate, vinyl acetate, or butadiene. These acrylonitrile-based polymers may be used singly or in admixture of more than one thereof.

Alternatively, the organic polymeric material containing acrylonitrile may be a combination of at least one acrylonitrile-based polymer with at least one non-acrylonitrile-based polymer. Examples of the non-acrylonitrile-based polymers include thermoplastic plastics such as polyvinyl butyral, polybutadiene, a butadiene-styrene copolymer, polycarbonate, or methyl poly(methylmethacrylate); and thermosetting plastics such as an epoxy resin or a phenolic resin. Addition of such a non-acrylonitrile-based polymer allows variation of the acrylonitrile content of the organic polymeric material.

The organic polymeric material containing acrylonitrile, if the acrylonitrile content is 5% by weight or more, allows production by heating of a resistor having an excellent performance stability over time. If the insulating material layer 13 is required to be heat-resistant (e.g., resistant to heat of soldering), the organic polymeric material containing acrylonitrile preferably comprises a combination of an acrylonitrile-based polymer and a thermosetting plastic. In this case, the acrylonitrile content of the organic polymeric material is preferably within the range of 30 to 50% by weight.

The insulating material may further contain a fine powder of an insulating metal oxide material so as to allow uniform coating of the layer 13 upon being admixed with the organic polymeric material selected from those enumerated above, and/or to control the resistance of an obtained resistor element. Examples of such a metal oxide material include silicon dioxide, alumina, clay or the like. If the purpose of adding a metal oxide material is mainly to allow uniform application of the layer 13, a metal oxide material in the form of a fine powder having an average particle size of about 50 m μm may be added in the amount of up to about 15% of the total amount of the resultant resinous composition. On the other hand, if the purpose of adding a metal oxide material is mainly to control the resistance of a resistor element (to increase the effective length of the resistor element and to increase the resistance by virtue of presence of the powder), the mean particle size may be up to about 10 μm. In this case, the powder may be contained in an amount up to about 50% by weight of the resultant resinous composition. In either case, the organic polymeric material constitutes a main constituent (i.e., 50% or more) of the resinous insulating material.

The resinous insulating material as described above is applied on the substrate 11 either directly or in the form of a solution in a suitable organic solvent (e.g., dimethylformamide, methyl ethyl ketone, n-butyl carbitol acetate or the like) with or without addition of a surfactant (an anti-foaming agent or the like). The insulating material is applied on the substrate 11 and is heated to remove the solvent. If necessary, the applied insulating material is cured by heating. A thin layer 13 is thus formed.

In any case, if the insulating material layer 13 contains an organic polymeric material, only a portion thereof which is heated is carbonized and is converted into a resistor material.

The organic polymer material may be altered to more easily absorb thermal energy. Then, if the scanning speed is increased for the same thermal energy, the insulating material can be sufficiently carbonized to be converted into a resistor material. Accordingly, the resistance of a resistor which may be formed within a given area can be controlled within a wide range.

In general, for the same irradiated thermal energy, the organic polymer material can be converted into a resistor material having a higher resistance if the scanning speed of a thermal energy beam is faster. However, if the scanning speed exceeds a predetermined critical scanning speed, the organic polymeric material is not converted into a resistor and remains as an insulator. This critical scanning speed is relatively low. Accordingly, a maximum resistance of a resistor produced by carbonization under heating of an organic polymeric material is relatively low.

In contrast to this, if the organic polymer material is altered or modified to more easily absorb thermal energy, the critical scanning speed is significantly increased. As a result of this, a resistor having a higher resistance can be produced. The method of alteration or modification include a method for subjecting an organic polymer to a thermal aging (e.g., at 200° to 300° C. for 0.5 to 10 hours) for slight thermal decomposition and generation of coloring groups; adding to an organic polymeric material a dye or a pigment (e.g., carbon black, benzidine yellow, rhodamine Lake B) which easily absorbs thermal energy; incorporating into an organic polymer a functional group (e.g., primary, secondary and tertiary amino groups, nitro group) which easily absorbs thermal energy; mixing with an organic polymeric material a functional compound (e.g., azo compound, imidazole compound, nitro compound, amine compound) which easily absorbs thermal energy; coating on a layer of an organic polymeric material an oil-based material containing a dye or a pigment which easily absorbs thermal energy; and like methods.

In any of these alteration or modification methods, the degree of alteration should not be such that the insulating property of the organic polymeric material is impaired. In other words, the degree of alteration should not be so great that the organic polymeric material is converted into a resistor material. Such a degree of alteration can be easily determined by a simple preliminary experiment.

Since resistor elements 13*a* and 13*b* produced from an organic polymeric material generally consist of carbon, they are relatively fragile. It is, therefore, preferable to form an insulating protective film (e.g., an epoxy resin film) on at least these resistor elements.

Insulating materials which may be readily converted into a resistor include a so-called thick-film resistor paste which is mainly composed of powdery $RuO_2$ and glass and which exhibits insulation in a non-backed state. Thus, as insulating materials is included such a multicomponent insulating material containing a material which is an insulator before being heated and is converted into a resistor upon being heated.

EXAMPLE 1

A polyimide resin ("Tranice 3000" available from Toray Industries) was uniformly applied on a 96% purity alumina substrate. The applied resin coat was baked to form a polyimide resin layer of 25μm thickness. A conductive paste consisting of an Ag powder and a resin was printed on the resin layer and was cured to form two conductor layers. The distance between the two conductor layers was 1 cm.

A YAG laser beam was focused on the substrate and was scanned at a speed of 5 mm/sec from one conductor layer to the other so as to form one linear resistor element. The power of the laser was 5 W. The obtained resistor element had a width of about 60 μm and a resistance of 270.5 Ω. In order to reduce the resistance of this resistor to 200 Ω, a comb-like resistor having a pitch of 0.5 mm was additionally formed as shown in FIG. 1D. The laser was preset such that laser beam irradiation was stopped when the total resistance of the resistor elements reached 200 Ω, as described with reference to FIG. 2. A resistor having an actual resistance of 197.3 Ω was obtained.

According to the procedures followed in this example, a resistor of a resistance having an error of within ±5% from the target value can be produced. If the pitch of the additional comb-like resistor element is made 0.25 mm, a resistor having a resistance of 198.7 Ω was obtained. In this case, a resistance having an error of within ±2.5% can be produced.

EXAMPLE 2

A conductive paste consisting of an Ag powder and a resin was printed on a 96% purity alumina substrate and was cured to form two conductor layers having a distance of 1 cm therebetween. Thereafter, as shown in FIG. 1B, a polyimide resin ("Tranice 3000" available from Toray Industries) was uniformly applied and was baked to form a polyimide resin layer of 25 μm thickness.

Subsequently, a YAG laser beam was scanned from one conductor layer to the other to form a resistor element having a shape as shown in FIG. 4A. The power of the laser used was 5 W, and the scanning speed was 8 mm/sec. The resistor element obtained had a length of 27 mm, a width of about 60 μm, and a resistance of 10.8 kΩ.

In order to obtain a resistance of 8 kΩ between the two conductors, this value was preset in a resistance detection apparatus in the manner as described with reference to FIG. 2. An additional resistor element as shown in FIG. 4B was formed. The laser irradiation conditions at this time were the same as those of the first irradiation. The distance between the centers of the first resistor element and the additional resistor element was 55 μm. When laser beam irradiation was stopped in response to a signal from the detection apparatus, the resistance of the obtained resistor was measured to be 8.02 kΩ.

EXAMPLE 3

A conductive paste consisting of an Ag powder and a resin was printed on a 96% purity alumina substrate and cured so as to form two conductor layers having a distance of 1 cm therebetween. Subsequently, as shown in FIG. 1B, a polyimide resin ("Tranice 3000" available from Toray Industries) was uniformly applied and was baked so as to form a polyimide resin layer of 25 μm thickness.

Thereafter, a YAG laser beam was scanned from one conductor layer to the other to form a resistor element having a shape as shown in FIG. 4A. The power of the laser used was 5 W and the scanning speed was 10 mm/sec. The resistor element obtained had a length of 27 mm, a width of about 60 μm, and a resistance of 5 kΩ.

In order to obtain a resistance of 300 kΩ between the two conductor layers, this value was preset in a resistance detection apparatus in the manner as described with reference to FIG. 2. The resistor element previously produced was rescanned with the laser beam. The output power of the laser at this time was 5 W and the scanning speed was 1 mm/sec. Re-irradiation with the laser beam was performed from a point slightly displaced from the one conductor layer toward the other conductor layer. When laser beam irradiation was stopped in response to a signal from the resistance detection apparatus, the obtained resistor had a resistance of 302.5 kΩ.

EXAMPLE 4

Twenty grams of a 50% by weight solution of acrylonitrile in dimethylformamide were charged into a glass polymerization tube. After adding 0.1 g of azobisisobutyronitrile as a polymerization initiator, the tube was sealed and polymerization was performed at 70° C. for 2 hours. In this manner, a solution of polyacrylonitrile in dimethylformamide was obtained.

The polyacrylonitrile solution was applied on the surface of an alumina substrate having a thickness of 0.635 mm and was dried at 120° C. so as to form a polyacrylonitrile layer 31 (see FIG. 6) of about 15 μm. Using a YAG laser, predetermined portions of the polyacrylonitrile layer 31 were irradiated with a laser beam having a wavelength of 1.06 μm in the air to form two resistor elements.

Figure 6:
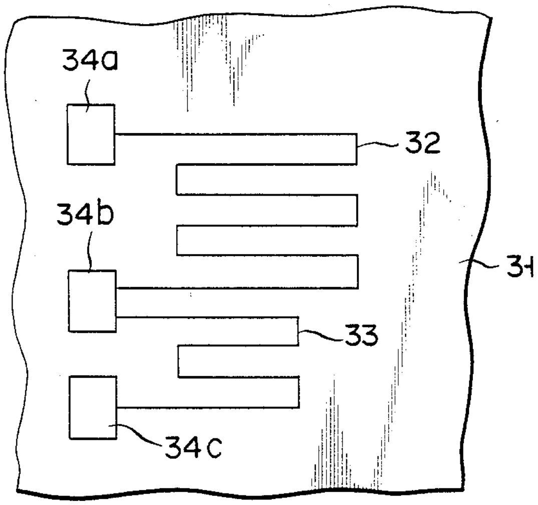
FIG. 6 is a plan view showing a resistor produced in one Example of the present invention.

As shown in FIG. 6, linear resistor elements 32 and 33 were formed, in respective rectangular zigzag patterns.

The resistor element 32 was formed at a laser output power of 5 W and a scanning speed of 80 mm/sec. The resistor element 32 had a length of 4 cm and a width of about 50 μm. On the other hand, the resistor element 33 was formed at an output power of 5.5 W and a scanning speed of 30 mm/sec. The resistor element 33 had a length of 3 cm and a width of about 50 μm.

"Conductive paste 6838" (a silver paste available from Du Pont de Nemours) was applied on the polyacrylonitrile layer 31 to be connected to the resistor elements 32 and 33, using a screen mask. The applied conductive paste was cured at 120° C. to form conductors 34a, 34b and 34c. As can be seen from FIG. 6, the conductor 34b commonly connected one end of each of the resistor elements 32 and 33.

The resistances of the resistor elements 32 and 33 were measured to be 65 kΩ and 3.5 kΩ, respectively.

Finally, "Solder Resist 70G" (an epoxy resin available from Tamura Kaken K.K.) was printed to cover the resistor elements 32 and 33 and the conductors 34a, 34b and 34c. The resist was cured at 120° C. to form a protective film (not shown). A desired printed circuit board was thus completed.

EXAMPLE 5

A solution of "Hiker 1031" (a butadieneacrylonitrile copolymer, with 35% by weight acrylonitrile content, available from Nippon Zeon Co., Ltd.) in methyl ethyl ketone was prepared. A resistor element (corresponding to the resistor element 33) was formed using this solution and following the procedures used in Example 4.

For the purpose of comparison, similar resistor elements were also formed using the same procedures and the following resins.

* Comparative Example 1 . . . "Acrylipet" (methyl methacrylate resin available from Mitsubishi Rayon Co., Ltd.) dissolved in cyclohexanone.

* Comparative Example 2 . . . "Epicoat 828" (bisphenol A-type epoxy resin containing 5% dicyandiamide available from Shell Chemical Co.)

* Comparative Example 3 . . . "Polymer Overcoat 6270B-2" (a polyimide-based paste available from Electro Material Corp., U.S.A.)

All the resistor elements including the element 33 of Example 4 were left to stand at a high temperature (120° C.×1,000 hours) and in a high humidity (relative humidity of 90% or more at 40° C.×1,000 hours). Changes in the resistances of the respective resistor elements were measured. The obtained results are shown in Table 1 below.

TABLE 1

| Resistor element | Initial resistance (kΩ) | Change: After standing at high temperature (%) | Change: After standing at high humidity (%) |
|---|---|---|---|
| Example 4 | 3.5 | −0.3 | +0.5 |
| Example 5 | 7.5 | −0.11 | +0.33 |
| Comparative Example 1 | 350 | +250 | +55 |
| Comparative Example 2 | 35 | +5.7 | +3.2 |
| Comparative Example 3 | 20 | +3.7 | +3.5 |

As can be seen from the results shown in Table 1 above, the resistor elements produced from an acrylonitrile-containing organic polymeric material in accordance with the present invention exhibit surprisingly good stability over time as compared to the resistor elements of the Comparative Examples.

EXAMPLE 6

A resin composition was prepared which consisted of 48% by weight of the butadiene-acrylonitrile copolymer used in Example 5 above, 48% by weight of the epoxy resin used in Comparative Example 2 above, 3.5% by weight of Aerosol (a colloidal silica available from Nippon Colloidal Silica K.K.), and 0.5% by weight of a methylsiloxane-based silicone oil. The composition was applied on an aluminum plate of 1 mm thickness and was cured at 150° C. for 2 hours. A resin layer having a thickness of about 50 μm was formed.

Figure 7:
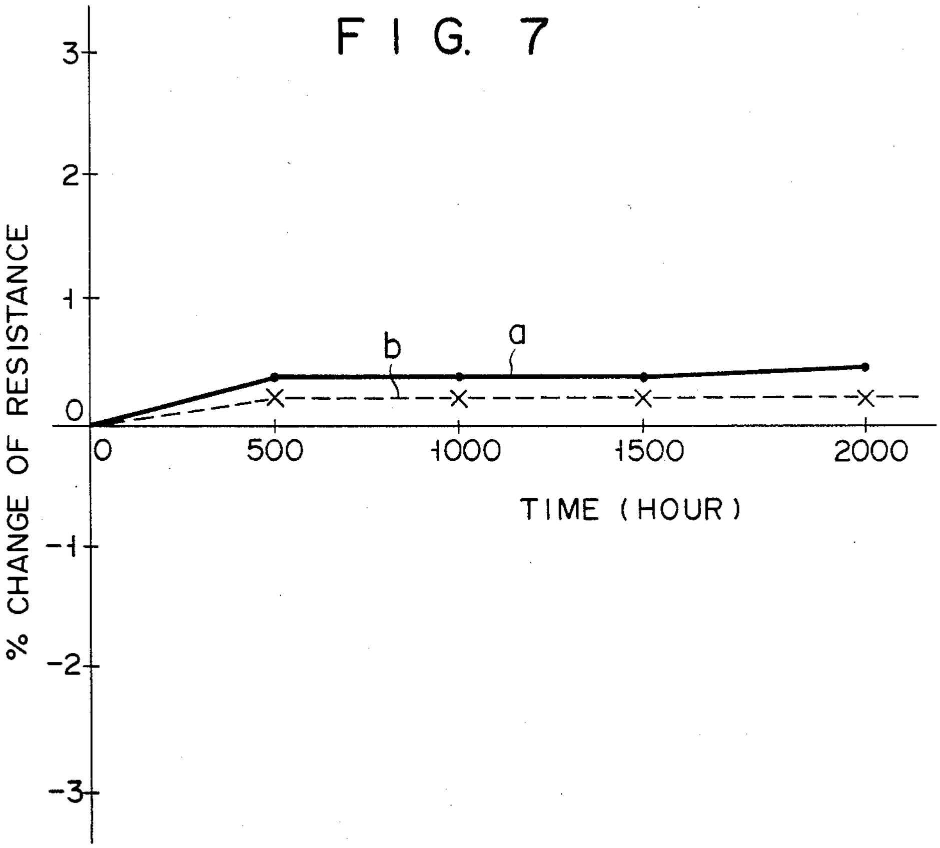
FIG. 7 is a graph showing the resistance stability with time of the resistor produced according to the present invention.

The resin layer was irradiated with a laser beam in a similar manner to that used in Example 4 so as to form a resistor element corresponding to the resistor element 32. The obtained resistor element had a resistance of 10 kΩ. This resistor element was left to stand at a high temperature (120° C.) and in a high humidity (RH 90%, 60° C.), and changes in the resistance thereof were measured. Results as indicated by solid curve a and dotted curve b in FIG. 7 were obtained, respectively.

As a result, the resistor element of the Example was shown to exhibit excellent stability over time. When a comparison is made between the resistor element of this Example and Comparative Example 2, it is seen that addition of an acrylonitrile-based polymer material to an epoxy resin (in this case, an organic polymeric material = butadiene-acrylonitrile copolymer + epoxy resin (1:1); 17.5% by weight acrylonitrile content) significantly improves the stability over time of the resistor element.

The resistor element was formed extending from the surface of the resin layer to a depth of about 10 μm. Since there remains a resin layer portion between the resistor element and the aluminum plate which is not carbonized, satisfactory insulation is guaranteed.

A resistor element produced from an acrylonitrile-containing organic polymeric material in accordance with the present invention exhibits excellent stability over time for the following reason. A conventional plastic material which does not contain acrylonitrile units tends to form noncrystalline carbon during thermal decomposition. In contrast to this, an organic polymer material containing acrylonitrile used in the present invention allows cutting of molecular chains containing acrylonitrile by heating, then is easily converted into a graphite-like material having a higher crystallinity. In fact, a carbonized material of the conventional plastic material has an outer appearance resembling carbon black. However, a carbonized material of an organic polymer material of the present invention is graphite-like and glossy and has a film-like shape.

EXAMPLE 7

A resistor was produced following the same procedures as those in Example 2 except that the butadieneacrylonitrile copolymer in Example 5 was used. The first-stage resistor element formed had a resistance of 15.5 kΩ. In order to set the resistance of the obtained resistor at 8 kΩ, the second resistor element was formed. The final resistor had a resistance of 7.95 kΩ.

EXAMPLE 8

"Tranice 3000" containing 2% by weight of carbon black was uniformly applied on each 96% purity alumina substrate (50 cm×50 cm×0.6 mm) and was cured at 250° C. to form polyimide resin layers of 15 μm.

The resin layers were scanned with a laser beam using a Nd:YAG laser scanner ("Laser Trimmer LAY-711" available from TOSHIBA CORPORATION). The output power of the laser was 5 W and the scanning speed was varied in the continuous oscillation mode within the range of 10 to 250 mm/sec.

An Ag paste ("Dotite XA-273" available from Fujikura Kasei K.K.) was printed using a screen mask and was cured at 150° C. for 30 minutes to form conductor layers having a distance of 8 mm therebetween and formed at the two ends of each resistor. The resistances between each pair of two conductor layers thus formed were measured. The scanning speed of the laser and the resistance had the relationships as shown in Table 2 below.

For the purpose of comparison, the result obtained upon scanning "Tranice 3000" alone with a laser beam is also shown in Table 2.

TABLE 2

| | Scanning speed (mm/sec) | Resistance (Ω/mm) |
|---|---|---|
| Example 8 | 10 | 110 |
| | 25 | 125 |
| | 50 | 225 |
| | 75 | 540 |
| | 100 | 1000 |
| | 125 | 2250 |
| | 150 | 4300 |
| | 200 | 19000 |
| | 250 | 78000 |
| Comparative Example | 10 | 125 |
| | 25 | 140 |
| | 50 | Resistor not formed |
| | 75 | Resistor not formed |
| | 100 | Resistor not formed |
| | 125 | Resistor not formed |
| | 150 | Resistor not formed |
| | 200 | Resistor not formed |
| | 250 | Resistor not formed |

It can be seen from the results shown in the table above that an organic polymer layer which easily absorbs an energy beam allows variation of the resistance over a wide range, and allows formation within a small area of a resistor having a high resistance. Additionally, the carbon-containing composition of this example had a resistance higher than $10^9$ Ω.cm, so is an insulator.

EXAMPLE 9

"Hiker 1031" (a butadiene-acrylonitrile copolymer available from Nippon Zeon Co., Ltd.; about 35% by weight acrylonitrile content) was dissolved in methyl ethyl ketone. The resultant solution was uniformly applied on an alumina substrate similar to that used in Example 8, and was dried to form an acrylonitrile copolymer layer of 10 μm thickness. After curing the copolymer layer at 180° C. for 30 minutes, it was thermally aged at 230° C. in the air for 4 hours to be changed to be dark brown in color.

The acrylonitrile copolymer layer was scanned with a laser scanner as that used in Example 1, while varying the scanning speed. An acrylonitrile copolymer layer which was not subjected to thermal aging for 4 hours only allowed production of a resistor up to a scanning speed of 30 mm/sec at an output power of 6 W. However, in the case of the copolymer layer of this Example, a resistor could be produced up to a scanning speed of 200 mm/sec. The copolymer layer of the Example allowed formation of a resistor having a resistance of 125 μ/mm to 125 kΩ/mm at scanning speeds within the range of 10 mm/sec to 200 mm/sec.

According to the method of the present invention, when a resistor is produced by conversion of an insulating material into a resistor material under heating, in particular, under laser beam irradiation, the resistance of the resistor being produced is monitored. Accordingly, a resistor having a desired resistance can be formed with high precision. The resistor trimming step can thus be omitted. Since a resistor may be formed after mounting various electric parts on a circuit board, the so-called function trimming is facilitated and repair of the circuit is easy. The resistance of a resistor can be controlled by changing it gradually.

When an acrylonitrile-containing polymer material is used, stability over time of the resultant resistor formed by irradiation with a laser beam is significantly improved over that of a conventional resistor element produced similarly by irradiation with a laser beam. According to the present invention, even if a resistor is left standing in a high temperature and/or high humidity, changes in the resistance thereof are small. Accordingly, a printed circuit board with higher reliability can be produced in accordance with the present invention.

What is claimed is:

1. A method for producing a resistor having a predetermined resistance, comprising:

(a) providing a substrate, at least a surface layer portion of which is made of an insulating material which can be converted into a resistor material upon being heated, first and second conductor layers bewng formed which are in contact with said surface layer portion of said substrate so as to have a distance therebetween;

(b) locally heating said surface layer portion of said substrate between said first and second conductors to convert the insulating material at said heated portion into said resistor material, thereby forming at least one first resistor element comprising said resistor material, said at least one first resistor element having two ends contacted with said first and second conductor layers; and (c) while measuring a resistance between said first and second conductor layers, locally heating said surface layer portion of said substrate between said first and second conductor layers to convert the insulating material at said heated portion into said resistor material, thereby forming at least one second resistor element comprising said resistor material and contacting said at least one first resistor element, until a second-stage resistor comprising said at least one first resistor element and at least one second resistor element and having said predetermined resistance is produced and wherein said second linear resistor element crosses said first linear resistor element at at least one point.

2. A method for producing a resistor having a predetermined resistance, comprising:

(a) providing a substrate, at least a surface layer portion of which is made of an insulating material which can be converted into a resistor material upon being heated, first and second conductor layers being formed to be in contact with said surface layer portion of said substrate so as to have a distance therebetween;

(b) locally heating said surface layer portion of said substrate between said first and second conductor layers to convert the insulating material at said heated portion into said resistor material, thereby forming at least one first resistor element comprising said resistor material, said at least one first resistor element having two ends contacted with said first and second conductor layers; and (c) while measuring a resistance between said first and second conductor layers, locally heating said surface layer portion of said substrate between said first and second conductor layers along said first resistor element to convert the insulating material at said heated portion into said resistor material, thereby forming at least one second resistor element comprising said resistor material and contacting said at least one first resistor element in a longitudinal direction of said first resistor element, until a second-stage resistor comprising said at least one first resistor element and at least one second resistor element and having said predetermined resistance is produced.

3. A method according to claims 1 or 2, wherein the insulating material comprises an organic polymeric material.

4. A method according to claim 3, wherein the polymeric material contains acrylonitrile in an amount of not less than 5% by weight.

5. A method according to claim 4, wherein the organic polymeric ,material comprises at least one acrylonitrile-based polymer.

6. A method according to claim 4, wherein the organic polymer material comprises a combination of at least one acrylonitrile-based polymer and at least one non-acrylonitrile-based polymer.

7. A method according to claim 6, wherein the non-acrylonitrile-based polymer comprises a thermosetting polymer.

8. A method according to claim 4, wherein the organic polymeric material contains acrylonitrile in an amount of 30 to 50% by weight.

9. A method according to claim 3, wherein the insulating material contains a powder of a metal oxide.

10. A method according to claims 1 or 2, wherein local heating is preformed by irradiation with a laser beam.

11. A method according to claims 1 or 2, wherein said first linear resistor element is formed after said first and second conductor layers are formed.

12. A method according to claims 1 or 2, wherein said first linear resistor element is formed before said first and second conductor layers are formed.

13. A method for producing a resistor comprising: layer providing a substrate, at least a surface layer portion of which is made of an insulating material comprising an organic polymeric material containing a combination of not less than 5% by weight of acrylonitrile and at least one non-acrylonitrile polymer; and selectively heating said surface layer portion so as to carbonize said organic polyermic material at the heated portion, and converting said organic polymeric material at said portion into a resistor material.

14. A method according to claim 13, wherein the non-acrylonitrile-based polymer comprises a thermosetting polymer.

15. A method for producing a resistor comprising:

providing a substrate, at least a surface layer portion of which is made of an insulating material comprising an organic polymeric material containing not less than 5% by weight of acrylonitrile and a powder of metal oxide; and selectively heating said surface layer portion so as to carbonize said organic polymeric material at the heated portion, and converting said organic polymeric material at said portion into a resistor material.

16. A method for producing a resistor comprising:

providing a substrate, at least a surface layer portion of which is made of an insulating material comprising an organic polymeric material containing an amount of 30% to 50% by weight of acrylonitrile; and selectively heating said surface layer portion so as to carbonize said organic polymeric material at the heated portion, and converting said organic polymeric material at said portion into a resistor material.

17. A method according to claim 13, 15, or 16 , wherein local heating is performed by irradiation with a laser beam.

18. A method according to claim 13, 15, 16, wherein said resistor comprises at least one first linear resistor element, two ends of which are connected to first and second conductor layers formed in contact with said surface layer portion and spaced apart from each other, and at least one second linear resistor element which is formed in contact with said at least one first linear resistor element.

19. A method according to claim 18, wherein after sa first linear resistor element is formed between said first and second conductor layers, said second resistor element is formed while measuring a resistance between said first and second conductor layers, until a predetermined resistance is obtained.

20. A method according to claim 19, wherein said second linear resistor element crosses said first linear resistor element at at least one point.

21. A method according to claim 19, wherein said second linear resistor element is in contact with said first linear element in a longitudinal direction.

* * * * *